United States Patent [19]
Huang

[11] Patent Number: 5,799,758
[45] Date of Patent: *Sep. 1, 1998

[54] DOUBLE-ACTING HYDRAULIC CYLINDER FOR USE IN AN EXERCISING APPARATUS

[76] Inventor: Chen-tan Huang, 3F, No. 7-2, Alley 10, Kungyuan Rd., Hsinchuang City, Taipei Hsien, Taiwan

[*] Notice: The term of this patent shall not extend beyond the expiration date of Pat. No. 5,618,248.

[21] Appl. No.: 697,188

[22] Filed: Aug. 20, 1996

[51] Int. Cl.$^6$ .................................................. F16F 9/48
[52] U.S. Cl. ................ 188/285; 188/315; 188/322.13; 188/318
[58] Field of Search ....................... 188/315, 318, 188/322.14, 322.13, 322.15, 319, 285, 322.22, 281, 282, 322.17, 299, 320, 299.1, 314; 482/112, 111, 113; 213/223, 43, 45

[56] References Cited

U.S. PATENT DOCUMENTS

| | | | |
|---|---|---|---|
| 4,291,787 | 9/1981 | Brentham | 482/112 |
| 4,709,791 | 12/1987 | Houghton | 188/322.14 |
| 5,070,970 | 12/1991 | Johnston et al. | 188/318 |
| 5,172,794 | 12/1992 | Ward | 188/322.13 |
| 5,618,248 | 4/1997 | Huang | 482/113 |

FOREIGN PATENT DOCUMENTS

| | | | |
|---|---|---|---|
| 4203539 | 7/1992 | Japan | 188/285 |
| 633970 | 2/1994 | Japan | 188/315 |

*Primary Examiner*—Douglas C. Butler
*Attorney, Agent, or Firm*—William E. Pelton, Esq.

[57] ABSTRACT

A double-acting hydraulic cylinder for use in an exercising apparatus to provide a resistance to a user of the exercising apparatus is disclosed. The hydraulic cylinder comprises a cylindrical body having an inner wall and an outer wall, a piston rod attached with a piston movably mounted within the inner wall and dividing a space within the inner wall into a rear chamber and a front chamber, a rear seat hermetically mounted on a rear end of the body and defining a first bypass communicating a space between the inner and outer walls with the rear chamber, a first disk normally closing the first bypass, a resistance adjusting mechanism rotatably mounted in the rear seat, a front cap hermetically mounted on a front end of the body, a front seat mounted between the front cap and the body and defining a second bypass communicating the space between the inner and outer walls with the front chamber, and a communicating tube extending between the inner and outer walls and communicating the front chamber with the rear chamber and the space between the inner and outer walls via the resistance adjusting mechanism.

14 Claims, 6 Drawing Sheets

DOUBLE-ACTING HYDRAULIC CYLINDER FOR USE IN AN EXERCISING APPARATUS

FIELD OF THE INVENTION

The present invention is related to a double-acting hydraulic cylinder, particularly to a double-acting hydraulic cylinder used in an exercising apparatus to provide a resistance to a user of the exercising apparatus.

BACKGROUND OF THE INVENTION

Double-acting hydraulic cylinders are now widely used in exercising apparatuses to provide a resistance to a user who is exerting a force on the cylinder thereby to strengthen his (her) muscles.

However, the conventional double-acting hydraulic cylinder used in an exercising apparatus has the following disadvantages.

Firstly, when a piston of the hydraulic cylinder is forced to move within the hydraulic cylinder from one side to another side, the side of the hydraulic cylinder from which the piston is moved away cannot be immediately supplied with hydraulic oil in the hydraulic cylinder; thus, when a user exerts a pulling force immediately following exerting a pushing force on the hydraulic cylinder, at the beginning of the pulling operation, he (she) will experience a period of operation in which there is substantially no resistance from the hydraulic cylinder, which causes the operation of the apparatus to be not smooth.

Secondly, since the resistance obtainable from the conventional hydraulic cylinder is constant, the versatility of the conventional hydraulic cylinder is limited. The resistance of the conventional hydraulic cylinder cannot be adjusted to meet the different requirements of different users; for example, an adult may require a heavy resistance and a youth may require a light resistance from the hydraulic cylinder.

The present invention therefore is aimed to provide an improved double-acting hydraulic cylinder used in an exercising apparatus to mitigate and/or obviate the aforementioned problems.

SUMMARY OF THE INVENTION

It is an objective of the present invention to provide a double-acting hydraulic cylinder wherein when a piston of the hydraulic cylinder is forced to move within the hydraulic cylinder from one side to another side, the side of the hydraulic cylinder from which the piston is moved away can be immediately supplied with hydraulic oil in the hydraulic cylinder Another object of the present invention is to provide a double-acting hydraulic cylinder wherein the resistance obtainable from the hydraulic cylinder is adjustable.

A further objective of the present invention is to provide a double-acting hydraulic cylinder wherein the resistance of the hydraulic cylinder can be adjusted by simply rotating a single control rod.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
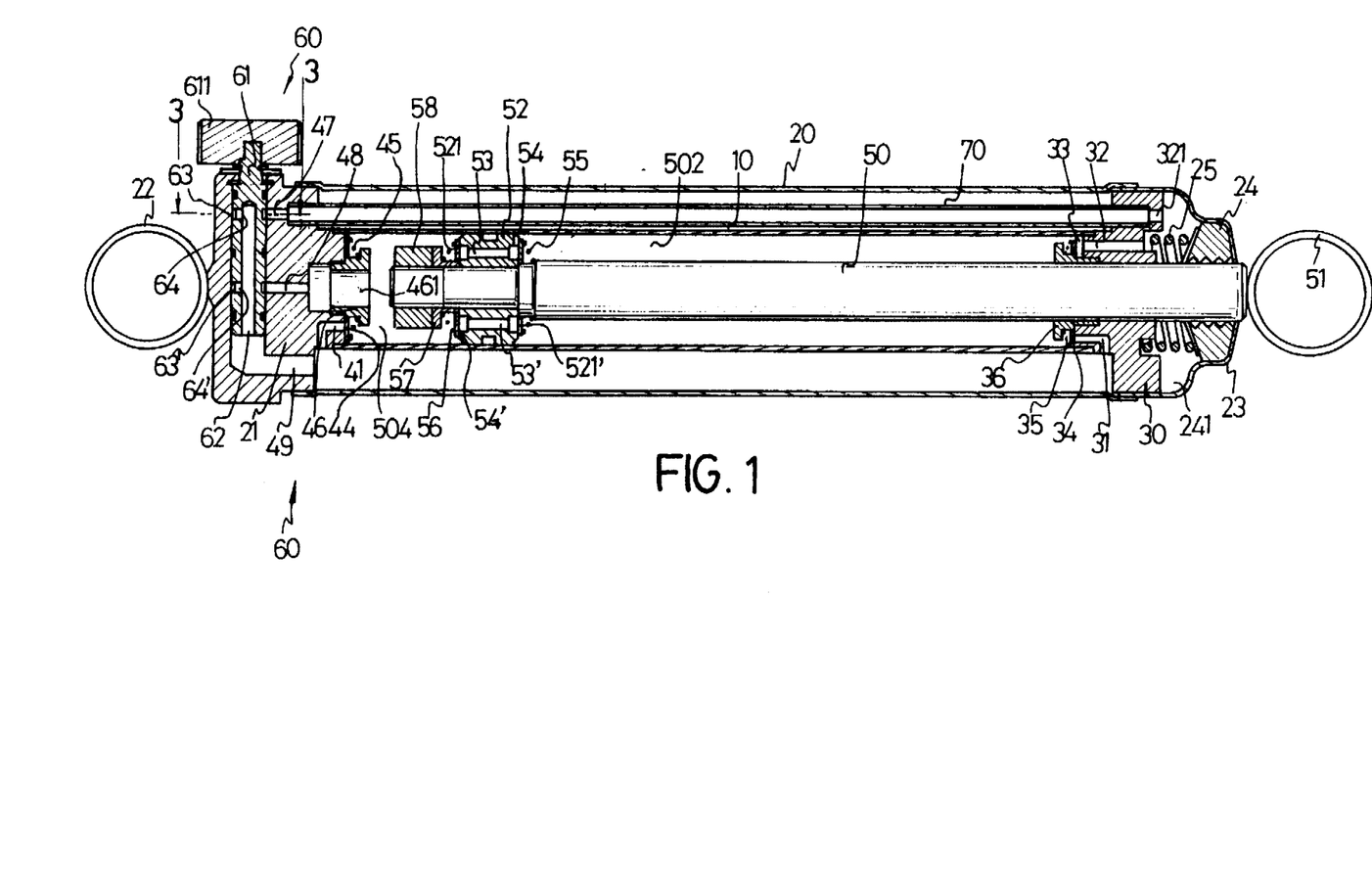
FIG. 1 is a cross-sectional view showing a double-acting hydraulic cylinder in accordance with a first embodiment of the present invention.
Figure 2:
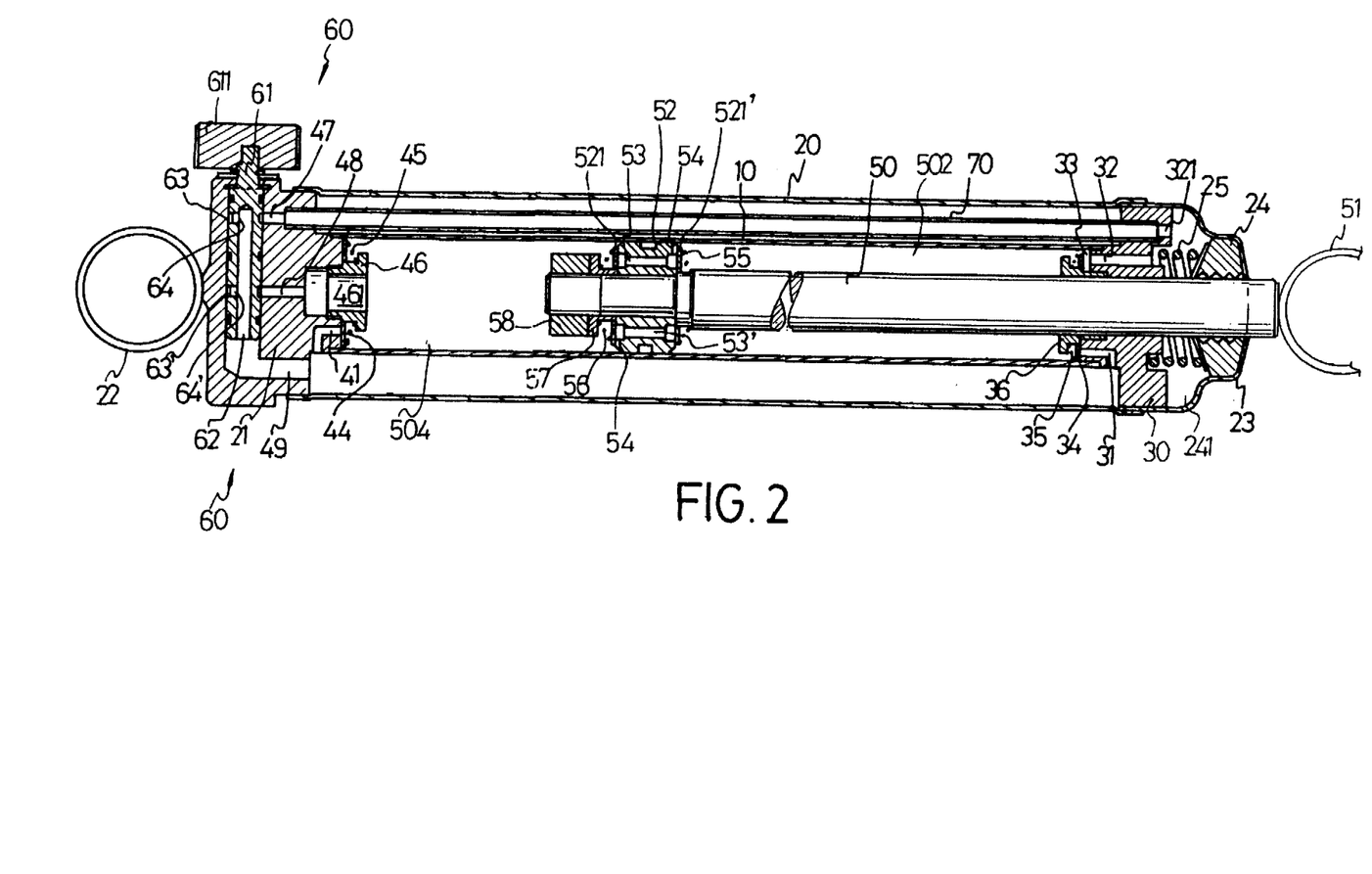
FIG. 2 is a view similar to FIG. 1 but showing that a piston of the hydraulic cylinder is pulled to the right a distance.

Referring to FIGS. 1 and 2 which show a first embodiment of a double-acting hydraulic cylinder in accordance with the present invention. The hydraulic cylinder is mounted on an exercising apparatus (not shown) to provide a resistance to a user of the exercising apparatus whereby the user's muscles may be strengthened.

The hydraulic cylinder generally consists of a cylindrical body defining an outer wall 20 and an inner wall 10, a communicating tube 70 extending between the outer wall 20 and the inner wall 10, a front cap 23 fixedly and hermetically mounted on a front end of the body and a rear seat 21 fixedly and hermetically mounted on a rear end of the body. A rear ring 22 is fixedly mounted on a rear end of the rear seat 21. The rear ring 22 is also fixedly connected to the exercising apparatus (not shown). A piston rod 50 is slideably mounted in the inner wall 10. A front ring 51 is fixedly attached on a front end of the piston rod 50. The front ring 51 is used to connect with a suitable means (not shown) for the user to grip so that the user can exert a pushing or pulling force on the hydraulic cylinder.

A piston 52 is fixedly mounted on a rear portion of the piston rod 50 and hermetically engages with the inner wall 10. The piston divides an inner space of the inner wall 10 into a front chamber 502 and a rear chamber 504. An upper hole 53 and a lower hole 53' are respectively defined in an upper portion and a lower portion of the piston 52. The upper hole 53 has a front end communicating with the front chamber 502 via a first slit 54 and a rear end normally being closed by a first disk 521. The lower hole 53' has a front end normally being closed by a second disk 521' and a rear end communicating with the rear chamber 504 via a second slit 54'. A first spring 55 is mounted between the second disk 521' and the piston rod 50 to exert a pushing force on the second disk 521'. A second spring 56 is mounted between the first disk 521 and a first stop member 57 to exert a pushing force on the first disk 521. A nut 58 is threadedly engaged with a rear end of the piston rod 50 to fixedly mount the first stop member 57, the second spring 56, the first disk 521, the piston 52, the second disk 521' and the first spring 55 on the rear portion of the piston rod 50.

A second stop member 46 is fixedly attached on a front end of the rear seat 21 and located in the rear chamber 504. The second stop defines a central passage 461. A third disk 44 is mounted around the second stop member 46 and a spring 45 is compressed between the third disk 44 and the second stop member 46 to exert a pushing force on the third disk 44 to push it toward the rear seat 21.

The rear seat 21 is formed to have an upper passage 47 in communication with the communicating tube 70, a middle passage 48 in communication with the rear chamber 504 via the central passage 461, and a lower passage 49 in communication with a space defined between the outer wall 20 and the inner wall 10.

A front seat 30 is mounted between the front cap 23 and the cylindrical body. The front seat 30 is formed to have a first L-shaped bypass 31, a long hole 32 and a short hole 321. The first L-shaped bypass 31 has a front end communicating with the space defined between the outer wall 20 and the inner wall 10. The short hole 321 is in communication with the communicating tube 70. The long hole 32 has a rear end in communication with the front chamber 502 via a third slit 33. A third stop member 36 is fixedly mounted on a front end of the front seat 30 and slideably engages with the piston rod 50. A fourth disk 34 is mounted around the third stop member 36. A fourth spring 35 is mounted between the third stop member 36 and the fourth disk 34 to exert a pushing force on the fourth disk 34 to push it toward the front seat 30 thereby to normally close a rear end of the first L-shaped bypass 31. A large seal 24 is mounted in a front end of the cap 23 and hermetically engages with the piston rod 50. A fifth spring 25 is compressed between the seal 24 and the front seat 30. A communicating space 241 is defined within the front cap 23 and between the large seal 24 and the front seat 30.

A second L-shaped bypass 41 is defined in the rear seat 21 wherein the bypass 41 has a front end which is normally closed by the third disk 44 and a rear end in communication with the space defined between the outer wall 20 and the inner wall 10.

A resistance adjusting mechanism 60 to control the resistance of the hydraulic oil acting on the piston 52 is mounted in the rear seat 21. The resistance adjusting mechanism 60 includes a control rod 61 which is extended into the rear seat 21 and rotatably fixed therein, and a head 611 which is fixedly attached on a top of the control rod 61 so that when the head 611 is rotated the control rod 61 rotates accordingly. A plurality of O-rings (not labeled) are provided around the control rod 61 to ensure that the control rod 61 can have a hermetical engagement with the rear seat 21.

A blind hole 62 is defined in a center of the control rod 61. The blind hole 62 is communicated with the lower passage 49. Furthermore, a first recess 63 and a second recess 63' are defined in an outer periphery of the control rod 61. Since the first and second recesses 63 and 63' have configurations and functions similar to each other, hereafter we will only explain the details of the first recess 63. The first recess 63 is in communication with the upper passage 47 while the second recess 63' is in communication with the middle passage 48. Furthermore, the first recess 63 is in communication with the blind hole 62 via a first radially extending hole 64 while the second recess 63' is in communication with the blind hole 62 via a second radially extending hole 64'.

Figure 3:
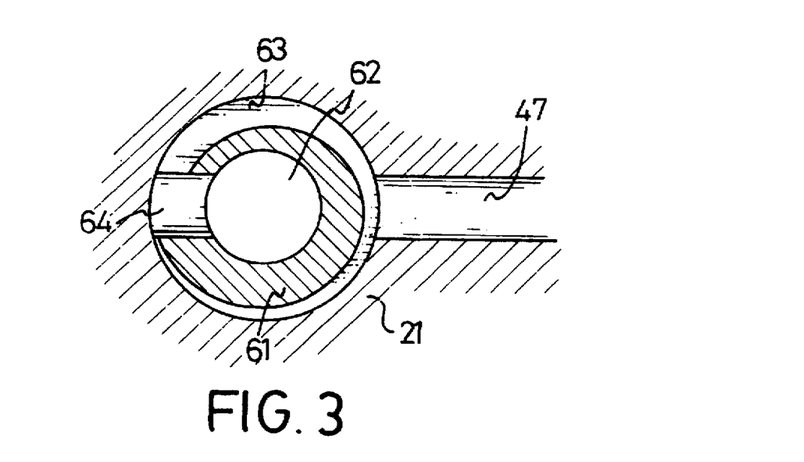
FIG. 3 is a cross-sectional view taken from line 3—3 of FIG. 1.

Now please particularly refer to FIG. 3. The first recess 63 is communicated with the upper passage 47. The depth of the first recess 63 is gradually changed along the periphery of the control rod 61. The first recess 63 is communicated with the first radially extending hole 64 which is then communicated with the blind hole 62. Thus, oil come from the upper passage 47 can flow into the blind hole 62 via the first recess 63 and the first radially extending hole 64. Since the first recess 63 has a gradually changing depth, rotation of the control rod 61 by rotating the head 611 can change the cross-sectional area of the channel by which the oil can flow from the upper passage 47 to enter the blind hole 62.

Now please return to FIGS. 1 and 2. The following description is related to how the hydraulic cylinder in accordance with the present invention works.

The hydraulic cylinder is filled with oil. When the front ring 51 is pulled by a user to move toward the right of FIG. 1 to reach the position as shown by FIG. 2, a minor portion of the oil in the front chamber 502 will firstly flow backwardly through the first slit 54, the upper hole 53 to open the first disk 521 to enter the rear chamber 504, thereby to facilitate the initial movement of the piston 52; otherwise, since the path for the oil in the front chamber 502 to flow into the rear chamber 504, which includes the long hole 32, the communicating tube 70, the upper passage 47, the first recess 63, etc., is relatively long, an initial movement of the piston 52 may only compress the oil, which causes the initial movement of the piston 52 to become very difficult.

During the movement of the piston 52 toward the right, a major portion of the oil in the front chamber 502 will flow through the third slit 33, the long hole 32, the space 241, the short hole 321, the communicating tube 70, the upper passage 47, the first recess 63, the first radially extending hole 64 to enter the blind hole 62. The oil entering the blind hole 62 will have a portion flowing through the second radially extending hole 64', the second recess 63', the middle passage 48 and the central hole 461 to enter the rear chamber 504 and a further portion flowing into the space defined between the inner wall 10 and the outer wall 20 via the lower passage 49. The oil entering the space defined between the inner wall 10 and the outer wall 20 then will flow into the rear chamber 504 via the second L-shaped bypass 41.

Moreover, immediately after the piston 52 is moved to the right, a vacuum pressure will be created in the rear chamber 504. The vacuum pressure will induce the third disk 44 to leave the front end of the second L-shaped bypass 41 and the oil already existing in the space defined between the inner wall 10 and the outer wall 20 to immediately flow into the rear chamber 504.

Alternatively, when the piston 52 is pushed toward the left, a minor portion of the oil in the rear chamber 504 will flow forwardly through the second slit 54', and the lower hole 53' to open the second disk 521' to enter the front chamber 502 to facilitate the initial movement of the piston 52.

Moreover, immediately after the piston 52 is moved to the left, a vacuum pressure will be created in the front chamber 502. The vacuum pressure will induce the fourth disk 34 to leave the rear end of the first L-shaped bypass 31 and the oil in the space defined between the inner wall 10 and the outer wall 20 to immediately flow into the front chamber 502.

During the movement of the piston toward the left, a major portion of the oil in the rear chamber 504 will flow through the central hole 461, the middle passage 48, the second recess 63' and the second radially extending hole 64' to enter the blind hole 62. The oil entering the blind hole 62 then will have a portion flowing into the space defined between the inner wall 10 and the outer wall 20 via the lower passage 49, and a further portion flowing through the first radially extending hole 64, the first recess 63, the upper passage 47, the communicating tube 70, the short hole 321, the space 241, the long hole 32 and the slit 33 to enter the front chamber 502.

No matter whether the piston 52 is moved to the left or the right, the chamber 504 or 502 can be immediately supplied with the hydraulic oil in the space defined between the inner wall 10 and the outer wall 20 via the bypass 41 or 31; thus, the hydraulic cylinder in accordance with the present invention can enable a user thereof to very smoothly operate the exercising apparatus.

Furthermore, by rotating the head 611 to rotate the control rod 61 to change the position of the recesses 63 and 63' relative to the upper and middle passages 47 and 48, the cross-sectional area of the channel by which the oil can flow from the rear chamber 504 to the front chamber 502 or vice versa can be changed, the counter-pressure of the hydraulic oil acting on the piston 52 when the piston 52 is forced to move can be changed; thus, the resistance of the hydraulic cylinder in accordance with the present invention can be adjusted by simply rotating a single control rod.

Figure 4:
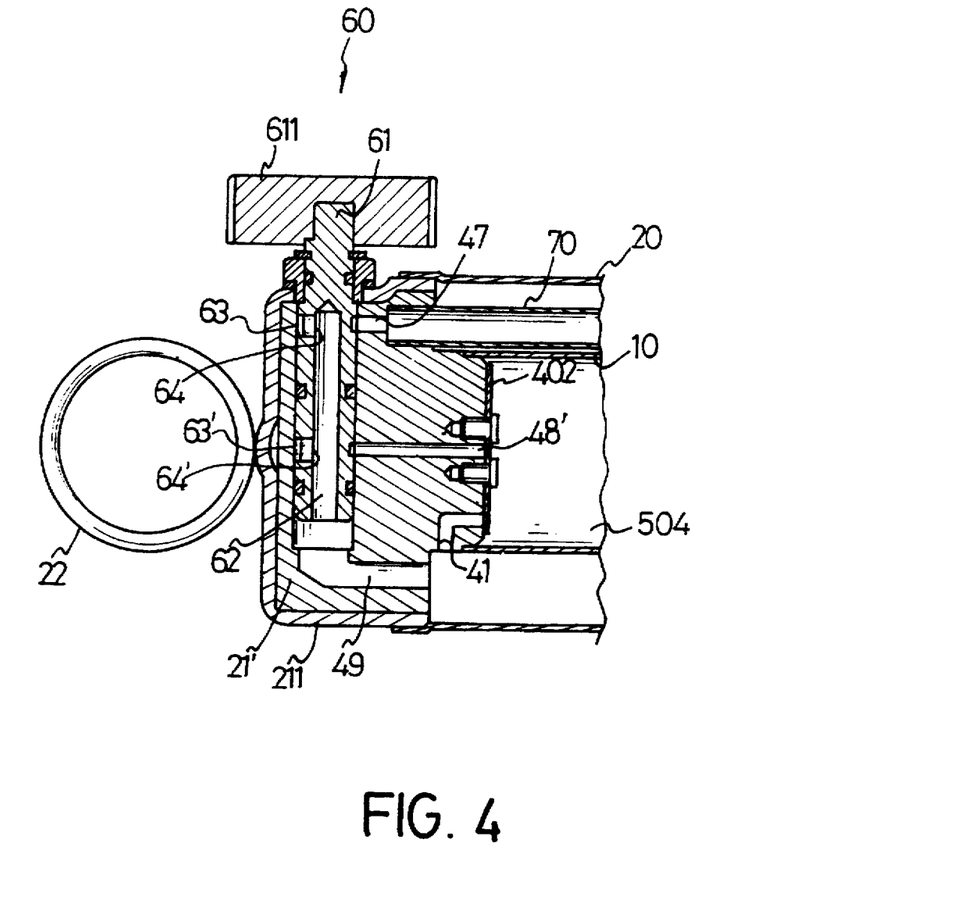
FIG. 4 is an enlarged cross-sectional view showing the details of a rear portion of a second embodiment of a double-acting hydraulic cylinder in accordance with the present invention.
Figure 5:
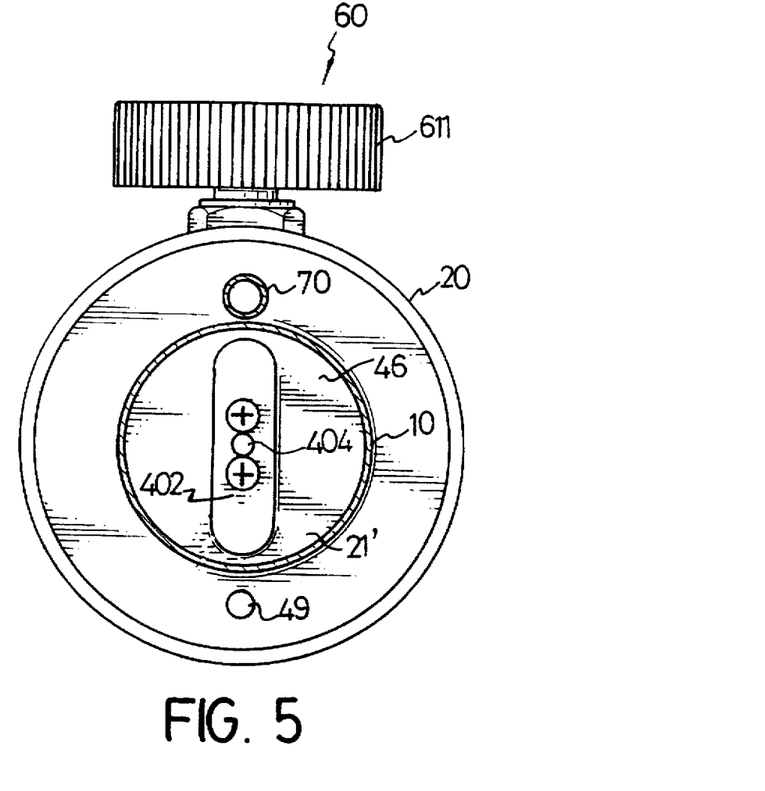
FIG. 5 is a right side view of FIG. 4.

FIGS. 4 and 5 show a rear portion of a second embodiment of a double-acting hydraulic cylinder in accordance with the present invention. The structure of the second embodiment is substantially the same as that of the first embodiment. A significant difference between the two embodiments is in that a rear seat 21' of the second embodiment is additionally equipped with a cover 211 to house the rear seat 21'. Furthermore, the second embodiment does not have the second stop member 46 and the spring 45 of the first embodiment, and the third disk 44 of the first embodiment in the second embodiment is replaced by an elongate plate 402. A front side of the rear seat 21' is configured to have a flat surface and a middle passage 48' is extended to the front side of the rear seat 21'. The elongate plate 402 is attached on the front side of the rear seat 21' by two screws (not labeled) extending into the rear seat 21' and has a central hole 404 in alignment with the middle passage 48'. A front end of the second L-shaped bypass 41 is normally closed by a lower portion of the elongate plate 402. However, when the piston (not shown in FIG. 3) of the hydraulic cylinder is forced to move toward the right of FIG. 4, a vacuum pressure will be created in the rear chamber 504. The vacuum pressure will induce the elongate plate 402 to leave the front end of the second L-shaped bypass 41 and the oil already existing in the space defined between the inner wall 10 and the outer wall 20 to immediately flow into the rear chamber 504.

Figure 6:
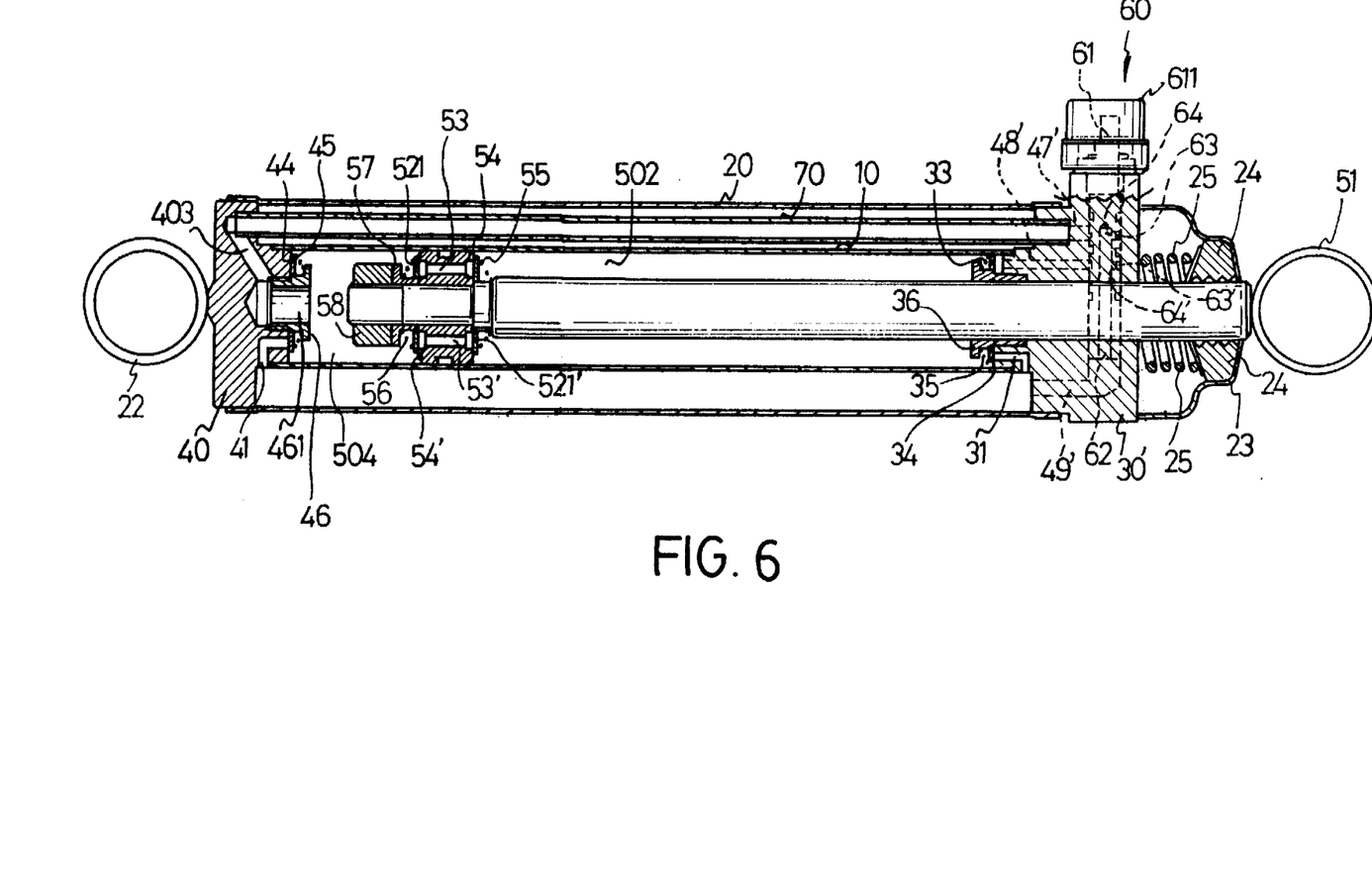
FIG. 6 is a view similar to FIG. 1 but showing a third embodiment of a double-acting hydraulic cylinder in accordance with the present invention.

FIG. 6 shows a third embodiment of a double-acting hydraulic cylinder in accordance with the present invention. The most significant difference of the third embodiment over the first embodiment is in that the resistance adjusting mechanism 60 is moved to the front end of the hydraulic cylinder. The third embodiment has a rear seat 40 hermetically mounted on the rear end of the body defining the outer wall 20 and the inner wall 10. The rear seat 40 defines an inclined passage 403 communicating the central hole 461 of the second stop member 46 with the communicating tube 70. A front seat 30' is hermetically mounted on a front end of the body and located between the body and the spring 25. The front seat 30' is formed to have an upper passage 47', a middle passage 48' and a lower passage 49'. The resistance adjusting mechanism 60 is mounted in the front seat 30' on a position in which the upper passage 47' is aligned with the first recess 63 to communicate the first recess 63 with the communicating tube 70, the middle passage 48' is aligned with the second recess 63' to communicate the second recess 63' with the front chamber 502 via the third slit 33 and the lower passage 49' is communicated with blind hole 62 to communicate the blind hole 62 with the space defined between the inner wall 10 and the outer wall 20.

When the front ring 51 is pulled by a user to move toward the right of FIG. 6, a minor portion of the oil in the front chamber 502 will firstly flow backwardly through the first slit 54, the upper hole 53 to open the first disk 521 to enter the rear chamber 504, thereby to facilitate the initial movement of the piston 52; otherwise, since the path for the oil in the front chamber 502 to flow into the rear chamber 504, which includes the middle passage 48', the communicating tube 70, the inclined passage 403, the central hole 461, etc., is relatively long, an initial movement of the piston 52 may only compress the oil, which causes that the initial movement of the piston 52 become very difficult.

During the movement of the piston 52 toward the right, a major portion of the oil in the front chamber 502 will flow through the third slit 33, the middle passage 48', the second recess 63', the second radially extending hole 64' to enter the blind hole 62. The oil entering the blind hole 62 will have a portion flowing through the first radially extending hole 64, the first recess 63, the upper passage 47', the communicating tube 70, the inclined passage 403, the central hole 461 to enter the rear chamber 504 and a further portion flowing into the space defined between the inner wall 10 and the outer wall 20 via the lower passage 49'. The oil entering the space defined between the inner wall 10 and the outer wall 20 then will flow into the rear chamber 504 via the first L-shaped bypass 31.

Moreover, immediately after the piston 52 is moved to the right, a vacuum pressure will be created in the rear chamber 504. The vacuum pressure will induce the third disk 44 to leave the front end of the second L-shaped bypass 41 and the oil already existing in the space defined between the inner wall 10 and the outer wall 20 to immediately flow into the rear chamber 504.

Alternatively, when the piston 52 is pushed toward the left of FIG. 6, a minor portion of the oil in the rear chamber 504 will flow forwardly through the second slit 54', the lower hole 53' to open the second disk 521' to enter the front chamber 502 to facilitate the initial movement of the piston 52.

Moreover, immediately after the piston 52 is moved to the left, a vacuum pressure will be created in the front chamber 502. The vacuum pressure will induce the fourth disk 34 to leave the rear end of the first L-shaped bypass 31 and the oil in the space defined between the inner wall 10 and the outer wall 20 to immediately flow into the front chamber 502.

During the movement of the piston toward the left, a major portion of the oil in the rear chamber 504 will flow through the central hole 461, the inclined passage 403, the communicating tube 70, the upper passage 47', the first recess 63 and the first radially extending hole 64 to enter the blind hole 62. The oil entering the blind hole 62 then will have a portion flowing into the space defined between the inner wall 10 and the outer wall 20 via the lower passage 49', and a further portion flowing through the second radially extending hole 64', the second recess 63', the middle passage 48' and the third slit 33 to enter the front chamber 502.

Figure 7:
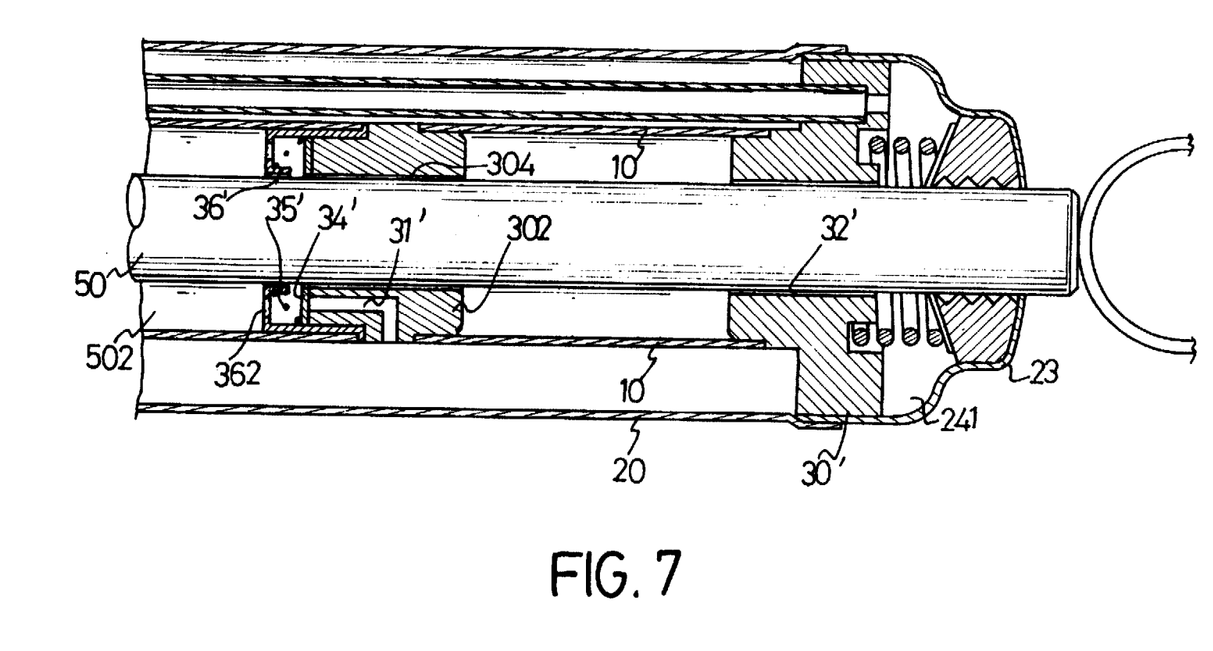
FIG. 7 is a view similar to FIG. 1 but showing a front portion of a fourth embodiment of a double-acting hydraulic cylinder in accordance with the present invention.

FIG. 7 shows a front portion of a fourth embodiment of a double-acting hydraulic cylinder in accordance with the present invention. The rear portion of the fourth embodiment has a structure the same as the that of the rear portion of the first embodiment as shown by FIG. 1.

In the fourth embodiment, a front seat 30' is mounted between the front cap 23 and the cylindrical body constituted by the inner wall 10 and the outer wall 20. The front seat 30' defines a plurality of first passages 32' extending therethrough and located neighboring the piston rod 50. A block 302 which defines an L-shaped bypass 31' is mounted between the piston rod 50 and the inner wall 10. The L-shaped bypass 31' communicates the space defined between the inner and outer walls 10 and 20 with the front chamber 502. The block 302 is located a distance behind the front seat 30'. The block 302 defines a plurality of second passages 304 extending therethrough and located neighboring the piston rod 50. A cup-shaped stop member 36' is mounted between the inner wall 10 and the piston rod 50 and located a distance behind the block 302. The stop member 36' has a front end clamped between the inner wall 10 and the block 302 and defines a plurality of holes 362 on a rear side thereof. A disk 34' is mounted around the piston rod 50 and located between the block 302 and the stop member 36'. A spring 35' is compressed between the stop member 36' and the disk 34' to push the disk 34' toward the L-shaped bypass 31' and thus the L-shaped bypass 31' is normally closed by the disk 34'.

When the piston rod 50 is pulled to the right in FIG. 7, oil in the front chamber 502 can flow to the communicating space 241 via the holes 362, the second passages 304 and the first passages 32'. When the piston rod 50 is pushed to the left in FIG. 7, a vacuum pressure will be created in the front chamber 502. The vacuum pressure will induce the disk 34' to leave the L-shaped bypass 31' and the oil in the space defined between the inner wall 10 and the outer wall 20 to immediately flow into the front chamber 502 via the L-shaped bypass 31' and the holes 362.

Since in this embodiment, the L-shaped bypass 31' is located nearer a center of the hydraulic cylinder, when the piston rod 50 is pushed to the left in the drawings, oil in the space defined between the inner wall 10 and the outer wall 20 can more quickly flow into the front chamber 502 via the L-shaped bypass 31'.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A double-hydraulic cylinder for use in an exercising apparatus to provide a resistance to a user thereof, comprising a cylindrical body comprising an outer wall and an inner wall and defining a front end and a rear end;

a front cap hermetically mounted on the front end of the body;

a piston rod extending through the front cap and attached with a piston movable within the inner wall, said piston dividing a space within the inner wall into a front chamber and a rear chamber;

a communicating tube extending between the outer and inner walls and communicating with the front chamber;

a rear seat adapted to be fixedly connected with the exercise apparatus, said rear seat being hermetically mounted on the rear end of the body and defining a first bypass communicating a space defined between the outer and inner walls with the rear chamber;

a first blocking member provided in the rear chamber for normally closing the first bypass, said first blocking member opening the first bypass when the piston is forced to move toward the front end of the body;

a front seat mounted between the front cap and the body and defining a second bypass communicating the space between the outer and inner walls with the front chamber;

a second blocking member provided in the front chamber for normally closing the second bypass, said second blocking member opening the second bypass when the piston is forced to move toward the rear end of the body; and a resistance adjusting means hermetically and rotatably mounted in the rear seat and defining a passage communicating with the communicating tube, the rear chamber and the space between the outer and inner walls to control a flow of hydraulic oil flowing from the front chamber to enter the rear chamber and the space between the outer and inner walls when the piston is forced to move toward the front end of the body and to control a flow of hydraulic oil flowing from the rear chamber to enter the front chamber and the space between the outer and inner walls when the piston is forced to move toward the rear end of the body, wherein the resistance adjusting means comprises a resistance adjusting rod rotatably extended into the rear seat and a head fixedly attached on the resistance adjusting rod, the passage communicating with the communicating tube, the rear chamber and the space between the outer and inner walls comprises a blind hole, a first recess and a second recess, wherein the blind hole is communicated with the space defined between the outer and inner walls, the first recess is defined in an outer periphery of the resistance adjusting rod, the first recess having a variable depth and communicating the communicating tube with the blind hole, the second recess is defined in the periphery of the rod, the second recess having a variable depth and communicating the rear chamber with the blind hole.

2. The double-acting hydraulic cylinder in accordance with claim 1, wherein the piston is formed to have a first and second holes extending to communicate the front chamber with the rear chamber and said hydraulic cylinder further comprises a third blocking member provided in the rear chamber for normally closing the first hole and a fourth blocking member provided in the front chamber for normally closing the second hole, said third blocking member opening the first hole when the piston is forced to move toward the front end of the body, said fourth blocking member opening the second hole when the piston is forced to move toward the rear end of the body.

3. The double-acting hydraulic cylinder in accordance with claim 1, wherein the first blocking member is a disk, said disk being pushed to close the first bypass by a spring force.

4. The double-acting hydraulic cylinder in accordance with claim 1, wherein the first blocking member is an elongate plate fixedly attached to the rear seat by at least one fixing point, said elongate plate having a lower portion spaced from the fixing point and normally closing the first bypass.

5. The double-acting hydraulic cylinder in accordance with claim 4, wherein said rear seat further comprises a cover to house the rear seat.

6. The double-acting hydraulic cylinder in accordance with claim 1 further comprising a seal positioned in the front cap and hermetically engaging with the piston, a spring compressed between the first seal and the front seat and a communicating space defined between the first seal and the front seat.

7. The double-acting hydraulic cylinder in accordance with claim 6, wherein the front seat is further formed with a long hole communicating the front chamber with the communicating space and a short hole communicating the communicating space with the communicating hole.

8. The double-acting hydraulic cylinder in accordance with claim 1, wherein the rear seat is formed to have an upper passage communicating the first recess with the communicating tube, a middle passage communicating the second recess with the rear chamber, and a lower passage communicating the blind hole with the space between the inner and outer walls.

9. The double-acting hydraulic cylinder in accordance with claim 1, wherein the first recess is communicated with the blind hole through a first radially extending hole defined in the resistance adjusting rod and the second recess is communicated with the blind hole through a second radially extending hole defined in the resistance adjusting rod.

10. A double-acting hydraulic cylinder for use in an exercising apparatus to provide a resistance to a user thereof, comprising:
   a cylindrical body having an outer wall and an inner wall and defining a front end and a rear end;
   a space defined between the outer wall and the inner wall;
   a communicating tube extending between the outer wall and the inner wall;
   a piston rod attached with a piston, movably mounted in an interior space within the inner wall; wherein the cylindrical body defines a first bypass and a second bypass which respectively communicate the space between the outer and inner walls with the interior space at the rear end and the front end of the cylindrical body;
   a first blocking member provided in the cylindrical body for normally closing the first bypass, said first blocking member opening the first bypass when the piston is forced to move toward the front end of the cylindrical body;
   a second blocking member provided in the cylindrical body for normally closing the second bypass, said second blocking member opening the second bypass when the piston is forced to move toward the rear end of the cylindrical body; and
   a resistance adjusting means mounted on the cylindrical body for controlling flow resistance of hydraulic fluid contained in the cylindrical body to change counter-pressure of the hydraulic fluid acting on the piston, said resistance adjusting means defining a passage communicating with the communicating tube, the interior space defined within the inner wall, and the space defined between the outer wall and the inner wall; wherein said resistance adjusting means comprises:
      a resistance adjusting rod; and
      a head fixedly attached on the resistance adjusting rod; wherein the passage communicating with the communicating tube, the interior space within the inner wall, and the space between the outer and inner walls comprises a blind hole, a first recess and a second recess, wherein the blind hole is defined in the resistance adjusting rod to communicate with the space defined between the outer wall and the inner wall of the cylindrical body, the first recess is defined in an outer periphery of the resistance adjusting rod, the first recess has a variable depth and communicates with the communicating tube with the blind hole, the second recess is defined in the periphery of the resistance adjusting rod, the second recess has a variable depth and communicates the interior space with the blind hole.

11. The double-acting hydraulic cylinder in accordance with claim 10, comprising, an upper passage communicating the first recess with the communicating tube, a middle passage communicating the second recess with the interior space defined within the inner wall and a lower passage communicating the blind hole with the space defined between the inner and outer walls.

12. The double-acting hydraulic cylinder in accordance with claim 10, wherein the first recess is communicated with the blind hole through a first radially extending hole defined in the resistance adjusting rod and the second recess is communicated with the blind hole through a second radially extending hole defined in the resistance adjusting rod.

13. The double-acting hydraulic cylinder in accordance with claim 10, further comprising:
   a front cap hermetically mounted on the front end of the cylindrical body;
   a front seat mounted between the front cap and the cylindrical body; and
   a rear seat adapted to be fixedly connected with the exercising apparatus, said rear seat being hermetically mounted on the rear end of the cylindrical body; wherein:
   the piston rod extends through the front cap, said piston dividing the interior space within the inner wall of the cylindrical body into a front chamber and a rear chamber;
   the second bypass is defined in the front seat to communicate the space defined between the outer and inner walls with the front chamber of the interior space; and
   the first bypass is defined in the rear seat to communicate the space defined between the outer and inner walls with the rear chamber of the interior space;
   the communicating tube communicates with the rear chamber of the interior space defined within the inner wall of the cylindrical body;
   the first blocking member is provided in the rear chamber of the interior space defined within the inner wall of the cylindrical body;
   the second blocking member is provided in the front chamber of the interior space within the inner wall of the cylindrical body;
   the resistance adjusting rod is rotatably extended into the front seat;
   the passage defined in the resistance adjusting means communicates with the communicating tube, the front chamber of the interior space, and the space between the outer and inner walls, the second recess of the passage communicating the front chamber of the interior space within the interior wall of the cylindrical body, so that the resistance adjusting means is allowed to control a flow of the hydraulic fluid flowing from the front chamber to enter the rear chamber and the spaced defined between the outer and inner walls when the piston is forced to move toward the front end of the cylindrical body and to control a flow of the hydraulic fluid flowing from the rear chamber to enter the front chamber and the space between the outer and inner walls when the piston is forced to move toward the rear end of the cylindrical body.

14. The double-acting hydraulic cylinder in accordance with claim 10, further comprising:
   a front cap hermetically mounted on the front end of the cylindrical body;
   a front seat mounted between the front cap and the cylindrical body; and
   a rear seat adapted to be fixedly connected with the exercise apparatus, said rear seat being hermetically mounted on the rear end of the body; wherein:
   the piston rod extends through the front cap, said piston dividing the interior space within the inner wall into a front chamber and a rear chamber;

the second bypass is defined in the front seat to communicate the space between the outer and inner walls with the front chamber of the interior space;

the first bypass is defined in the rear seat to communicate the space defined between the outer and inner walls with the rear chamber of the interior space;

the first blocking member is provided in the rear chamber of the interior space defined within the inner wall of the cylindrical body;

the second blocking member is provided in the front chamber of the interior space defined within the inner wall of the cylindrical body;

the resistance adjusting rod is rotatably extended into the rear seat;

the passage defined in the resistance adjusting means communicates with the communicating tube, the rear chamber of the interior space and the space between the outer and inner walls, the second recess of the passage communicating the rear chamber of the interior space within the inner wall of the cylindrical body; whereby the resistance adjusting means is allowed to control a flow of the hydraulic fluid flowing from the front chamber to enter the rear chamber and the space defined between the outer and inner walls when the piston is forced to move toward the front end of the cylindrical body and to control a flow of the hydraulic fluid flowing from the rear chamber to enter the front chamber and the space between the outer and inner walls when the piston is forced to move toward the rear end of the cylindrical body.

* * * * *